United States Patent
Takenaka

(10) Patent No.: US 6,961,627 B2
(45) Date of Patent: Nov. 1, 2005

(54) CONTROL SYSTEM

(75) Inventor: Toru Takenaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/498,966

(22) PCT Filed: Dec. 26, 2002

(86) PCT No.: PCT/JP02/13593
§ 371 (c)(1),
(2), (4) Date: Jun. 16, 2004

(87) PCT Pub. No.: WO03/058355
PCT Pub. Date: Jul. 17, 2003

(65) Prior Publication Data
US 2005/0120444 A1 Jun. 2, 2005

(30) Foreign Application Priority Data
Dec. 28, 2001 (JP) .................................. 2001-399422

(51) Int. Cl.⁷ .............................................. G05B 13/02
(52) U.S. Cl. .......................... 700/34; 700/28; 700/31; 700/33; 700/37; 700/46; 700/52; 700/53; 318/561; 318/568.1; 318/568.11
(58) Field of Search .......................... 700/28, 30, 31, 700/33, 34, 37, 46, 50, 52, 53; 318/561, 568.1, 568.11

(56) References Cited

U.S. PATENT DOCUMENTS

| | | | | |
|---|---|---|---|---|
| 5,216,342 A | * | 6/1993 | Torii et al. ............... | 318/568.1 |
| 5,380,181 A | * | 1/1995 | Hiraoka et al. ........... | 425/145 |
| 5,410,470 A | * | 4/1995 | Yamaoka et al. .......... | 700/45 |
| 6,326,702 B1 | * | 12/2001 | Yonekura et al. .......... | 290/40 C |
| 6,530,358 B2 | * | 3/2003 | Kalweit et al. ............ | 123/295 |
| 6,738,679 B2 | * | 5/2004 | Fujita et al. ............... | 700/56 |

FOREIGN PATENT DOCUMENTS

| | | | | | |
|---|---|---|---|---|---|
| JP | 361199106 A | * | 9/1986 | ........... | G05B/13/00 |
| JP | 363184802 A | * | 7/1988 | ........... | G05B/13/04 |
| JP | 01-152504 | | 6/1989 | | |
| JP | 02-299003 | | 12/1990 | | |
| JP | 403085602 A | * | 4/1991 | ........... | G05B/13/02 |
| JP | 404268601 A | * | 9/1992 | ........... | G05B/13/02 |
| JP | 05-002406 | | 1/1993 | | |
| JP | 05-250004 | | 9/1993 | | |
| JP | 06-095744 | | 4/1994 | | |
| JP | 407219602 A | * | 8/1995 | ........... | G05B/13/02 |

* cited by examiner

Primary Examiner—Ramesh Patel
(74) Attorney, Agent, or Firm—Rankin, Hill, Porter & Clark LLP

(57) ABSTRACT

A control system that constantly and accurately controls a control variable so that it remains within an allowable range is provided. The control system in accordance with the present invention estimates a steady-state deviation d in a controlled object as a steady-state deviation estimation value d' on the basis of a control variable y and a final desired value $y_2$. A control variable y in a controlled object based on the initial desired value $y_1$ is estimated as the primary estimation value $y_1'$ on the basis of at least the initial desired value $y_1$ and the steady-state deviation estimation value d'. If a primary estimation value $y_1'$ is within an allowable range, then a final desired value $y_2$ agreeing with an initial desired value $y_1$ is determined, while, if the primary estimation value $y_1'$ is out of the allowable range, then the final desired value $y_2$ is determined on the basis of at least a boundary value of the allowable range. A manipulation variable x is determined on the basis of the final desired value $y_2$.

11 Claims, 11 Drawing Sheets

CONTROL SYSTEM

TECHNICAL FIELD

The present invention relates to a system for controlling a control variable of a controlled object.

BACKGROUND ART

Hitherto, as a control system having a limiting function, a control system A shown in FIG. 12 has been known. An output (control variable) y of a controlled object B is controlled by the control system A.

The control system A is equipped with a manipulation variable determining unit $A_1$, a limiter $A_2$, and an integrating unit $A_3$.

The manipulation variable determining unit $A_1$ has a transmission element $G_0$ and outputs a primary manipulation variable $x_1$ according to an expression (a) shown below on the basis of a difference $y_0-y$ between a desired value $y_0$ and the control variable y.

$$x_1 = G_0 \cdot (y_0 - y) \tag{a}$$

The limiter $A_2$ outputs a secondary manipulation variable $x_2$ on the basis of an input of the primary manipulation variable $x_1$. To be more specific, the limiter $A_2$ directly outputs the primary manipulation variable $x_1$ as the secondary manipulation variable $x_2$ if the primary manipulation variable $x_1$ remains in a predetermined range. If, on the other hand, the primary manipulation variable $x_1$ is out of the predetermined range, then the limiter $A_2$ outputs a boundary value of the range as the secondary manipulation variable $x_2$.

The integrating unit $A_3$ has an integrating element $K/s$ and outputs a final manipulation variable x according to an expression (b) given below on the basis of an input of a difference between the second manipulation variable $x_2$ and the control variable y.

$$x = (K/s) \cdot (x_2 - y) \tag{b}$$

The controlled object B has a transmission element G and outputs the control variable y according to an expression (c) given below on the basis of an input of the manipulation variable x.

$$y = G \cdot x + d \tag{c}$$

where "d" denotes a steady-state deviation (offset) in the controlled object B.

According to the control system A having the aforesaid construction, if the control variable y is likely to be out of an "allowable range" based on the primary manipulation variable $x_1$, then the secondary manipulation variable $x_2$ is determined such that the primary manipulation variable $x_1$ is limited to be within the predetermined range by the limiter $A_2$. Thus, the control is conducted so as to restrict the control variable y to be within the allowable range.

A feedback loop comprised of the integrating unit $A_3$ and an adder $A_4$ located immediately upstream relative to the integrating unit $A_3$ determines the control variable x such that the steady-state deviation d of the controlled object B is cancelled. This allows control to be carried out such that the control variable y remains in the allowable range even if there is the steady-state deviation d.

If, however, a gain coefficient K (refer to expression (b)) in the integrating unit $A_3$ is high, then the feedback loop becomes unstable and oscillates or vibrates; therefore, the gain coefficient K must be controlled low. Thus, the responsiveness of the control variable y output from the controlled object B relative to the desired value $y_0$ input to the control system A undesirably deteriorates. As a result, an error (inaccuracy) of the control variable y relative to the desired value $y_0$ increases, and control accuracy may deteriorate and the control variable y may be out of the allowable range.

Accordingly, the present invention is intended to provide, as a solution, a control system that permits stable and accurate control so as to maintain a control variable in an allowable range.

DISCLOSURE OF INVENTION

The present invention relates to a control system for controlling a control variable y of a controlled object by a manipulation variable x.

A control system in accordance with the present invention as a solution to the aforesaid problem includes a steady-state deviation estimating means for estimating a steady-state deviation d in a controlled object as a steady-state deviation estimation value d' on the basis of the control variable y and a final desired value $y_2$, a primary estimating means for estimating the control variable y of the controlled object according to an initial desired value $y_1$ as a primary estimation value $y_1'$ on the basis of at least the initial desired value $y_1$ and the steady-state deviation estimation value d', a desired value determining means for determining the final desired value $y_2$ agreeing with the initial desired value $y_1$ if the primary estimation value $y_1'$ is within an allowable range, while determining the final desired value $y_2$ based on at least a boundary value of the allowable range if the primary estimation value $y_1'$ is out of the allowable range, and a manipulation variable determining means for determining a manipulation variable x according to the final desired value $y_2$.

According to the present invention, if the primary estimation value $y_1'$ (=estimation value of control variable y with the steady-state deviation d taken into account) is within the allowable range, then the final desired value $y_2$ that agrees (or substantially agrees) with the initial desired value $y_1$ is determined. In other words, the transmission element (a transmission element of the desired value determining means being also included) may be regarded as "1" from the initial desired value $y_1$ to the final desired value $y_2$ in a control system. Furthermore, the manipulation variable x is determined on the basis of the final desired value $y_2$, and then the control variable y is controlled on the basis of the manipulation variable x.

The initial desired value $y_1$ is determined as it is as the final desired value $y_2$ and the manipulation variable x is further determined, so that phase lags of the manipulation variable x and the control variable y relative to the initial desired value $y_1$ can be markedly reduced.

If the primary estimation value $y_1'$ is out of the allowable range, then the final desired value $y_2$ is determined on the basis of the "boundary value" of the allowable range. This makes it possible to conduct control so as to maintain the control variable y to remain in the allowable range even if there is the steady-state deviation d.

Hence, according to the present invention, a secondary estimation value $y_2'$ is determined, taking the steady-state deviation d into account, so as to remain within the allowable range, and the phase lag of the control variable y relative to the initial desired value $y_1$ is restrained. With this arrangement, stable and accurate control can be accomplished to prevent the control variable y from being out of the allowable range.

The control variable y may be one-dimensional (scalar) or multiple-dimensional (vector).

The present invention is characterized in that the steady-state deviation estimating means estimates, as the steady-state deviation estimation value d', the difference between the control variable y and a value obtained by passing the final desired value $y_2$ through a low-pass filter or a delaying means.

Furthermore, the present invention is characterized in that the steady-state deviation estimating means estimates, as the steady-state deviation estimation value d', the difference between a value obtained by passing the control variable y through the low-pass filter or the delaying means and a value obtained by passing the final desired value $y_2$ through the low-pass filter or the delaying means.

Furthermore, the present invention is characterized in that the steady-state deviation estimating means estimates, as the steady-state deviation estimation value d', a value obtained by passing the difference between the control variable y and the final desired value $y_2$ through a low-pass filter or a delaying means.

According to the present invention, the oscillation of the steady-state deviation estimation value d' is restrained by the low-pass filter or the delaying means, allowing the steady-state deviation estimation value d' to be accurately estimated. The final desired value $y_2$ is determined according to whether the primary estimation value $y_1$' based on the steady-state deviation estimation value d' is within the allowable range, and then the control variable y is controlled. Thus, the control variable y can be stably controlled so as not to be out of the allowable range regardless of the presence of the steady-state deviation d.

The "delaying means" refers to a means for saving a previous value and outputting it for the next time (the present time) in a digital circuit.

Furthermore, the present invention is characterized in that the primary estimating means estimates a sum of the initial desired value $y_1$ and the steady-state deviation estimation value d' or a value obtained by passing the sum $y_1+d'$ through the low-pass filter or the delaying means as the primary estimation value $y_1$'.

According to the present invention, the primary estimation value $y_1$' can be accurately determined on the basis of the initial desired value $y_1$ and the steady-state deviation estimation value d'. This allows the control variable y to be stably controlled so as not to be out of the allowable range.

The present invention is characterized by being provided with a secondary estimating means for directly using the primary estimation value $y_1$' as the secondary estimation value $y_2$' if the primary estimation value $y_1$' is within the allowable range, while using a value within the allowable range as the secondary estimation value $y_2$' if the primary estimation value $y_1$' is out of the allowable range, and the desired value determining means determines the final desired value $y_2$ on the basis of the secondary estimation value $y_2$' and the steady-state deviation estimation value d'.

Furthermore, the present invention is characterized in that, based on the primary estimation value $y_1$' the secondary estimating means determines the secondary estimation value $y_2$' by continuous or smooth mapping from the primary estimation value $y_1$' to the secondary estimation value $y_2$'.

According to the present invention, the secondary estimation value $y_2$' is determined on the basis of the continuous or smooth mapping, allowing the control variable y to be continuously or smoothly controlled.

Mapping f being "continuous" means that, when a distance (distance norm) between point a and point b is converged to zero, the distance between mappings f (a) and f (b) is also converted to zero, while mapping f (p) is continuous if a variable p is continuous. The mapping f being "smooth" means that grad (gradient) of the mapping f is continuous.

The present invention is characterized in that the desired value determining means subtracts the steady-state deviation estimation value d' from the secondary estimation value $y_2$' to determine the final desired value $y_2$.

The present invention is characterized in that the desired value determining means determines the final desired value $y_2$ on the basis of a difference between the control variable y and the secondary estimation value $y_2$' or a difference between the secondary estimation value $y_2$' and a value obtained by passing the control variable y through a low-pass filter or a delaying means according to a control rule for converging the difference to zero.

The present invention is characterized in that the desired value determining means determines the final desired value $y_2$ by passing a difference between the control variable y and the secondary estimation value $y_2$' or a difference between a value obtained by passing the control variable y through a filter or a delaying means and the secondary estimation value $y_2$' through a transmission element having at least integration.

According to the present invention, if the primary estimation value $y_1$' corresponds to a sum of the initial desired value $y_1$ and the steady-state deviation estimation value d' or if it corresponds to the sum and also remains in the allowable range, then the final desired value $y_2$ agreeing (or substantially agreeing) with the initial desired value $y_1$ can be determined. This allows the control variable y to be stably and accurately controlled so as to stay within the allowable range regardless of the presence or the absence of the steady-state deviation d.

Furthermore, the present invention is characterized in that the manipulation variable determining means has a transmission function $Gm^{-1}$ that satisfies a relationship of $Gm^{-1} \cdot G \approx 1$ between itself and the transmission function G of a controlled object.

According to the present invention, even if there is a phase lag of the control variable y relative to the manipulation variable x in a controlled object, the phase lag can be compensated. Hence, the control variable y can be accurately and stably controlled on the basis of the manipulation variable x according to the final desired value $y_2$.

BEST MODE FOR CARRYING OUT THE INVENTION

Embodiments according to the present invention will be explained in conjunction with the accompanying drawings.

First, a control system according to a first embodiment of the present invention will be explained in conjunction with FIG. 1 through FIG. 7.

Figure 1:
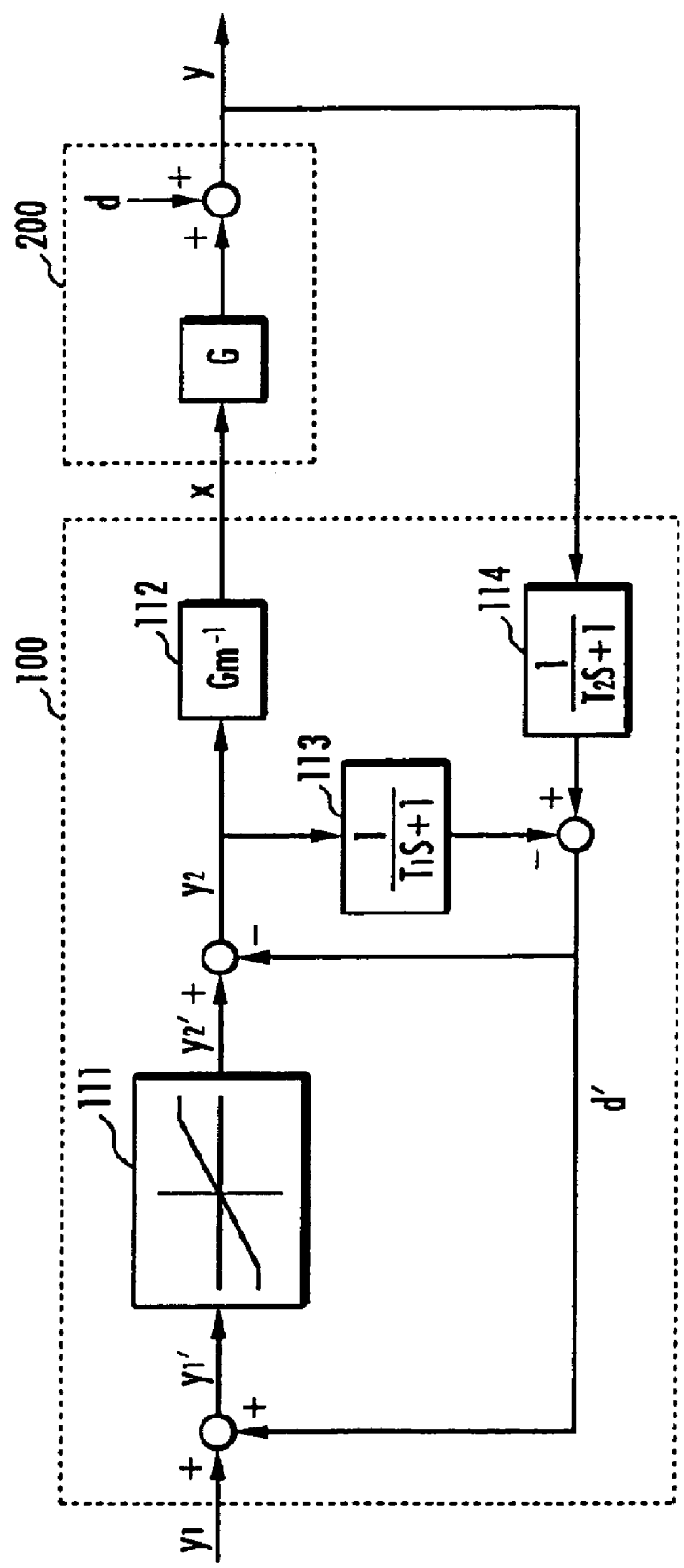
FIG. 1 is a block diagram of a control system according to a first embodiment of the present invention.

A control system 100 according to a first embodiment shown in FIG. 1 is equipped with a limiter 111, an inverse model arithmetic unit 112, a first filter 113, and a second filter 114. The control system 100 controls a control variable y of a controlled object 200 on the basis of a manipulation variable x.

The limiter 111 constitutes a "secondary estimating means" and determines and outputs a secondary estimation value $y_2'$ according to an input primary estimation value $y_1'$ on the basis of a mapping function (refer to FIG. 7(a)) represented by an expression (1) given below:

$$y_2' = y_1' \text{(if } y_- \leq y_1' \leq y_+\text{)} \; y_+ \text{(if } y_+ < y_1'\text{)} \; y_- \text{(if } y_1' < y_-\text{)} \tag{1}$$

More specifically, if the primary estimation value $y_1'$ is within an allowable range $[y_-, y_+]$, then the limiter 111 determines the secondary estimation value $y_2'$ that agrees with the primary estimation value $y_1'$. If the primary estimation value $y_1'$ exceeds an upper limit value $y_+$ of the allowable range $[y_-, y_+]$, then the limiter 111 determines the secondary estimation value $y_2'$ agreeing with the upper limit value y+. Furthermore, if the primary estimation value $y_1'$ is below a lower limit value $y_-$ of the allowable range $[y_-, y_+]$, then the limiter 111 determines the secondary estimation value $y_2'$ agreeing with the lower limit value $y_-$.

The mapping function representing the characteristic of the limiter 111 may be continuous and smooth mapping function of an S-shaped curve or the like shown in FIG. 7(b). The allowable range $[y_-, y_+]$ may be set beforehand to make it easy to set a mapping function that has saturation characteristics. Alternatively, the allowable range $[y_-, y_+]$ may be sequentially changed according to conditions.

The inverse model arithmetic unit 112 constituting a "manipulation variable determining means" has a transmission element $Gm^{-1}$ having a relationship represented by an expression (2) given below between itself and a transmission element G of the controlled object 200, and outputs the manipulation variable x according to an expression (3) given below on the basis of an input of final desired value $y_2$.

$$Gm^{-1} \cdot G \approx 1 \tag{2}$$

$$x \approx Gm^{-1} \cdot y_2 \tag{3}$$

The first filter 113 and the second filter 114 constitute a "steady-state deviation estimating means". The first filter 113 is a first-order lag filter of a time constant $T_1$ and receives the final desired value $y_2$. The second filter 114 is a first-order lag filter of a time constant $T_2$ and receives the control variable y. Based on outputs of the first filter 113 and the second filter 114, the steady-state deviation estimation value d' is determined according to an expression (4) given below.

$$d' = y \cdot \{1/(T_2 s+1)\} - y_2 \cdot \{1/(T_1 s+1)\} \tag{4}$$

The primary estimation value $y_1'$ is determined according to an expression (5) given below on the basis of the initial desired value $y_1$ and the steady-state deviation estimation value d', and the determined value $y_1'$ is supplied to the limiter 111.

$$y_1' = y_1 + d' \tag{5}$$

Furthermore, the final desired value $y_2$ is determined according to an expression (6) given below on the basis of the secondary estimation value $y_2'$ and the steady-state deviation estimation value d', and the determined value $y_2$ is supplied to the inverse model arithmetic unit 112.

$$y_2 = y_2' - d' \tag{6}$$

Considering a phase lag of a series system taking place between the inverse model arithmetic unit 112 and the controlled object 200, the time constant $T_1$ of the primary filter 113 and the time constant $T_2$ of the secondary filter 114 are set to be sufficiently large to secure stability of the controlled object 200 when the primary estimation value $y_1'$ is out of the allowable range $[y_-, y_+]$. At the same time, the time constants $T_1$ and $T_2$ are set to be sufficiently small so as to restrain deterioration of the responsiveness of the controlled object 200 when the primary estimation value $y_1'$ is out of the allowable range $[y_-, y_+]$.

The controlled object 200 has the transmission element G and outputs the control variable y on the basis of the manipulation variable x according to an expression (7) given below.

$$y = G \cdot x + d \tag{7}$$

where d denotes a steady-state deviation (offset) of the controlled object 200.

According to the control system 100 having the aforesaid construction, "the initial desired value $y_1$" and the "steady-state deviation estimation value d'" are added up (refer to expression (5)) and the sum of the two values ($=y_1+d'$) is supplied as "the primary estimation value $y_1'$" to the limiter 111. Based on the sum, "the secondary estimation value $y_2'$" is determined according to expression (1) and output by the limiter 111.

"The steady-state deviation estimation value d'" is based on the immediately preceding steady-state deviation d and corresponds to the steady-state deviation d of the controlled object 200 presumed to immediately follow.

"The primary estimation value $y_1'$" corresponds to the control variable y estimated by taking the steady-state deviation d into account if the manipulation variable x is determined such that it agrees with the initial desired value $y_1$.

"The secondary estimation value $y_2'$" corresponds to the control variable y estimated by taking the steady-state deviation d into account if the final desired value $y_2$ is determined such that the control variable y remains in the allowable range $[y_-, y_+]$ and that the manipulation variable x agrees with the final desired value $y_2$, in addition to the steady-state deviation d.

"The steady-state deviation estimation value d'" is subtracted from "the secondary estimation value $y_2'$" (refer to expression (6)), and the difference of the two values ($=y_2'-d'$) is supplied as "the final desired value $y_2$" to the inverse model arithmetic unit 112. Thus, "the manipulation variable x ($=Gm^{-1} \cdot y_2$)" is output according to expression (2) by the inverse model arithmetic unit 112.

Taking the steady-state deviation d into account, the final desired value $y_2'$ is determined such that the control variable y remains in the allowable range [y_, y_+]. "The manipulation variable x" is determined on the basis of the final desired value $y_2$.

Furthermore, based on an output of the first filter 113 according to the final desired value $y_2$ and an output of the second filter 114 according to the control variable y, the steady-state deviation estimation value d' is determined by expression (4).

As previously described, the sum of "the initial desired value $y_1$" and "the steady-state deviation estimation value d'" (=$y_1$+d') is supplied as "the primary estimation value $y_1$'," to the limiter 111, and the difference between "the secondary estimation value $y_2$'" and "the steady-state deviation estimation value d'" (=$y_2$'−d') output from the limiter 111 is supplied as "the final desired value $y_2$" to the inverse model arithmetic unit 112.

The control system 100 according to the first embodiment determines "the primary estimation value $y_1$'" as the sum of the "initial desired value $y_1$" and "the steady-state deviation estimation value d'" (=$y_1$+d') (refer to expression (5)). "The final desired value $y_2$" is determined as a difference between "the secondary estimation value $y_2$'" and "the steady-state deviation estimation value d'" (=$y_2$'−d') (refer to expression (6)). Furthermore, if "the primary estimation value $y_1$' (=an estimation value of the control variable y, taking the steady-state deviation d into account)" is within the allowable range [y_, y_+], then "the secondary estimation value $y_2$'" agreeing with "the primary estimation value $y_1$'" is determined (refer to expression (1)).

Accordingly, if the primary estimation value $y_1$' is within the allowable range [y_, y_+], then the final desired value $y_2$ agreeing with the initial desired value $y_1$ is determined as represented by an expression (8) given below. In other words, the transmission element may be regarded as "1" from the initial desired value $y_1$ to the final desired value $y_2$.

$$y_2 = y'_2 - d' \qquad (8)$$
$$= y'_1 - d'$$
$$= (y_1 + d') - d'$$
$$= y_1$$

Furthermore, the manipulation variable x is determined on the basis of the final desired value $y_2$ (refer to expression (3)), and then the control variable y is controlled on the basis of the manipulation variable x (refer to expression (7)).

The initial desired value $y_1$ is directly used as the final desired value $y_2$ and the manipulation variable x is determined, so that the phase lags of the manipulation variable x and the control variable y relative to the initial desired value $y_1$ can be markedly reduced.

If the primary estimation value $y_1$' is out of the allowable range [y_, y_+], then the secondary estimation value $y_2$' that agrees with the lower limit value y_ or the upper limit value y_+ of the allowable range [y_, y_+] is determined. Thereafter, the secondary estimation value $y_2$' and the final desired value $y_2$ are determined. This makes it possible to carry out control so that the control variable y remains in the allowable range even if there is the steady-state deviation d.

Moreover, the oscillation of the steady-state deviation estimation value d' is restrained by the first filter 113. This makes it possible to accurately estimate the steady-state deviation estimation value d' and the primary estimation value $y_1$'. Then, the final desired value $y_2$ is determined according to whether the primary estimation value $y_1$' is within the allowable range [y_, y_+], and then the control variable y is controlled. With this arrangement, control is stably carried out so that the control variable y does not go out of the allowable range regardless of the presence of the steady-state deviation d.

To explain the operation in more detail, if the primary estimation value $y_1$' is out of the allowable range [y_, y_+], then the secondary estimation value $y_2$' agreeing with the lower limit value y_ or the upper limit value y_+ is used, so that the transmission function from an input to an output of the limiter 122, excluding a steady-state component, is substantially "zero" (as long as the input (the primary estimation value $y_1$') is out of the allowable range [y_, y_+], then the output (the secondary estimation value $y_2$') remains constant even if the input varies). Hence, an expression (9) given below is obtained by determining a relationship among the secondary estimation value $y_2$', the steady-state deviation d and the control variable y by expressions (2) through (7).

$$y=[\{T_1T_2s^2+(T_1+T_2)s+1\}/(T_1T_2s^2+2T_1s+1)]y2'+\{(T_1T_2s^2+T_1s)/(T_1T_2s^2+2T_1s+1)\}d \qquad (9)$$

In a low frequency range (s to 0), expression (9) can be approximated to an expression (10) given below.

$$y \approx y_2' \qquad (10)$$

In other words, the control variable y substantially agrees with the secondary estimation value $y_2$' regardless of the steady-state deviation d. Thus, if the primary estimation value $y_1$' is out of the allowable range [y_, y_+], then the control variable y substantially agrees with the lower limit value y_ or the upper limit value y_+ independently of the steady-state deviation d.

Accordingly, the secondary estimation value $y_2$' is determined such that it remains in the allowable range [y_, y_+], taking the steady-state deviation d into account, and the phase lag of the control variable y relative to the initial desired value $y_1$ is restrained. This allows the control variable y to be stably and accurately controlled so as to remain within the allowable range [y_, y_+].

Figure 2:
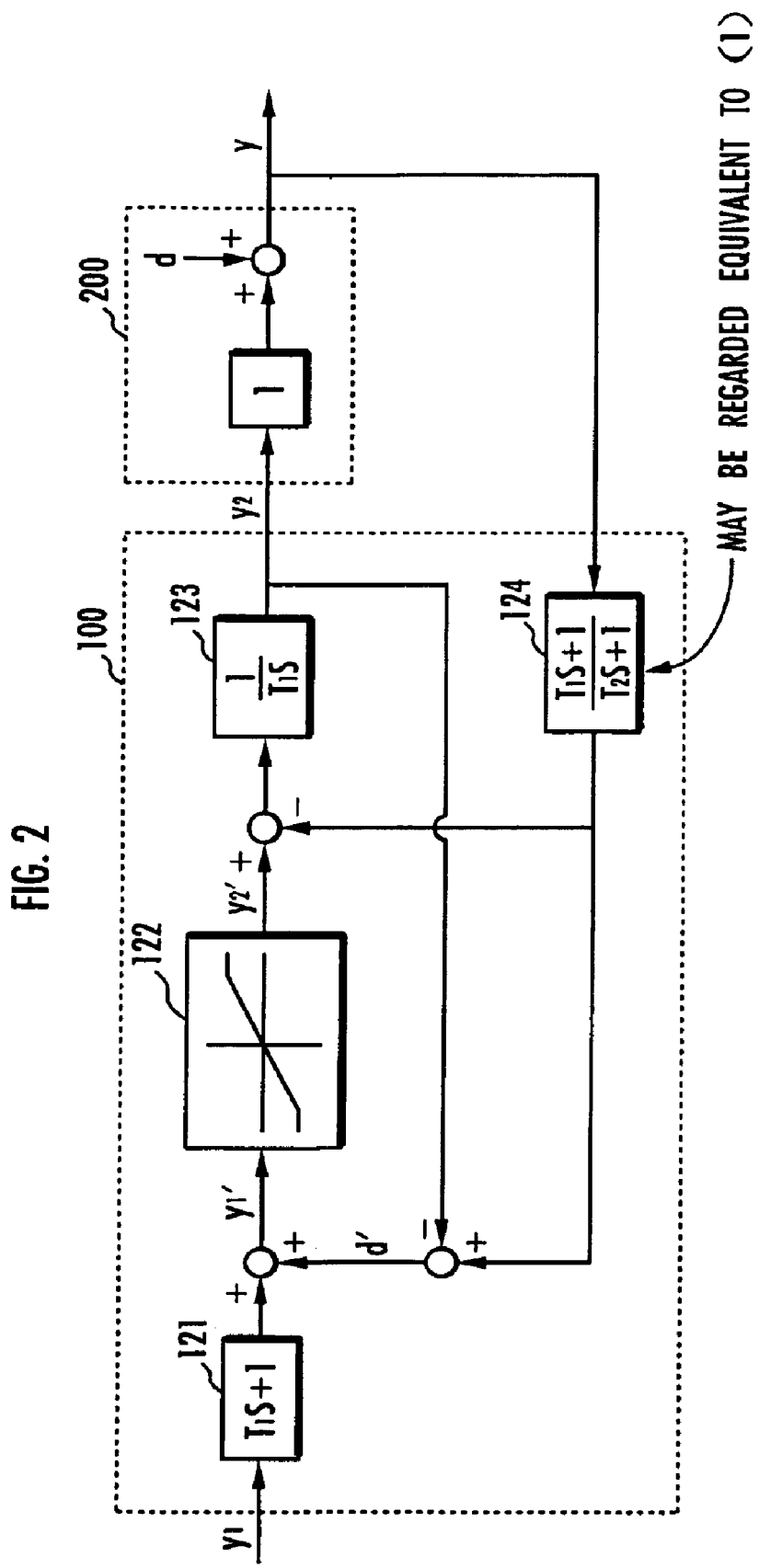
FIG. 2 is a block diagram of a control system according to a second embodiment of the present invention.

Referring now to FIG. 2, a control system according to a second embodiment of the present invention will be explained.

A block diagram of a control system 100 according to the second embodiment shown in FIG. 2 is an equivalent modification of the block diagram of the control system 100 according to the first embodiment shown in FIG. 1, and can be approximated to $T_1$ s to 0 in the low frequency range. Hence, the block diagram of the control system 100 according to the second embodiment can be obtained by going through approximate modifications to (primary lead filter of a time constant $T_1$)*(limiter) before and after (limiter)* (primary lead filter of time constant $T_1$ (transmission element $T_1$ s+1)).

From the relationship $Gm^{-1} \cdot G \approx 1$ of expression (2), the inverse model arithmetic unit 112 in the control system 100 according to the first embodiment is omitted, and the transmission element of a controlled object 200 is set to 1.

The control system 100 according to the second embodiment shown in FIG. 2 is equipped with a filter 121, a limiter 122, an integrating unit 123, and the filter 124.

The filter 121 is a primary lead filter of a time constant $T_1$ and provides outputs based on the initial desired value $y_1$.

The limiter 122 shares the same construction as that of the limiter 111 in the control system 100 according to the first embodiment.

The integrating unit 123 carries out integral operation (time constant $T_1$) using a received difference between an output of the limiter 122 and an output of the filter 124 so as to output the final desired value $y_2$.

The filter 124 has a transmission element $\{(T_1 s+1)/(T_2 s+1)\}$ and provides outputs based on the control variable y. The transmission element of the filter 124 can be approximated to $T_1 s \sim T_2 s \sim 0$ in a low frequency band, so that the transmission element of the filter 124 will be approximated to "1" in the following description.

The integrating unit 123 and the filter 124 constitute "a steady-state deviation estimating means." In the second embodiment, the steady-state deviation estimation value d' is determined according to an expression (11) as a difference between an output of the integrating unit 123 and an output of the filter 124.

$$d' = \{(T_1 s+1)/(T_2 s+1)\} \cdot y - y_2 \quad (11)$$
$$\approx 1 \cdot y - y_2$$

The control system 100 according to the second embodiment adds up an output of the filter 121 on the basis of the initial desired value $y_1$ ($=(T_1 s+1) \cdot y_1$) and the steady-state deviation estimation value d' ($=y-y_2$) and the sum of the two values is supplied as "the primary estimation value $y_1'$" to the limiter 122.

An output ($\approx y$) of the filter 124 is subtracted from "the secondary estimation value $y_2'$" (refer to expression (1)) output from the limiter 122 on the basis of "the primary estimation value $y_1'$" and the difference between the two is passed through the integrating unit 123 so as to determine a "final desired value $y_2$ ($=(y_2'-y) \cdot \{1/T_1 s\}$)".

The control system 100 according to the second embodiment determines the final desired value $y_2$ that agrees with the initial desired value $y_1$ according to a relational expression (12) given below if the primary estimation value $y_1'$ is within the allowable range $[y_-, y_+]$. In other words, the transmission element from the initial desired value $y_1$ to the final desired value $y_2$ can be regarded as "1".

$$\begin{aligned}
y_2 &= (y_2' - y) \cdot \{1/T_1 s\} & (12) \\
&= (y_1' - y) \cdot \{1/T_1 s\} \\
&= ((T_1 s+1) \cdot y_1 + d' - y) \cdot \{1/T_1 s\} \\
&= ((T_1 s+1) \cdot y_1 + (y - y_2) - y) \cdot \{1/T_1 s\} \\
\therefore \; T_1 s \cdot y_2 &= (T_1 s+1) \cdot y_1 - y_2 \\
\therefore \; y_2 &= y_1
\end{aligned}$$

Then, the control variable y is controlled on the basis of the final desired value $y_2$.

The initial desired value $y_1$ is directly determined as the final desired value $y_2$, and then the manipulation variable x is determined. This makes it possible to markedly reduce phase lags of the final desired value $y_2$ and the control variable y relative to the initial desired value $y_1$.

If the primary estimation value $y_1'$ is out of the allowable range $[y_-, y_+]$, then the secondary estimation value $y_2'$ agreeing with the lower limit value $y_-$ or the upper limit value $y_+$ of the allowable range $[y_-, y_+]$ is determined. After that, the secondary estimation value $y_2'$ and the final desired value $y_2$ are determined. With this arrangement, the control variable y can be controlled so as to remain in the allowable range $[y_-, y_+]$ even if there is the steady-state deviation d.

To explain the operation in more detail, if the primary estimation value $y_1'$ is out of the allowable range $[y_-, y_+]$, then the secondary estimation value $y_2'$ that agrees with the lower limit value $y_-$ or the upper limit value $y_+$ is used, so that the transmission function from an input to an output of the limiter 122, excluding a steady-state component, is substantially "zero" (as long as the input (the primary estimation value $y_1'$) is out of the allowable range $[y_-, y_+]$, then the output (the secondary estimation value $y_2'$) remains constant even if the input varies). Hence, an expression (13) given below is obtained by determining a relationship among the secondary estimation value $y_2'$, the steady-state deviation d and the control variable y.

$$y = \{1/(T_1 s+1)\} y_2' + \{T_1 s/(T_1 s+1)\} d \quad (13)$$

In a low frequency range (s to 0), expression (13) can be approximated to an expression (14) given below.

$$y \approx y_2' \quad (14)$$

In other words, the control variable y substantially agrees with the secondary estimation value $y_2'$ regardless of the steady-state deviation d. Thus, if the primary estimation value $y_1'$ is out of the allowable range $[y_-, y_+]$, then the control variable y substantially agrees with the lower limit value $y_-$ or the upper limit value $y_+$ independently of the steady-state deviation d.

Accordingly, the secondary estimation value $y_2'$ is determined such that it remains in the allowable range $[y_-, y_+]$, taking the steady-state deviation d into account, and the phase lag of the control variable y relative to the initial desired value $y_1$ is restrained. This allows the control variable y to be stably and accurately controlled so as to maintain it within the allowable range $[y_-, y_+]$.

Figure 3:
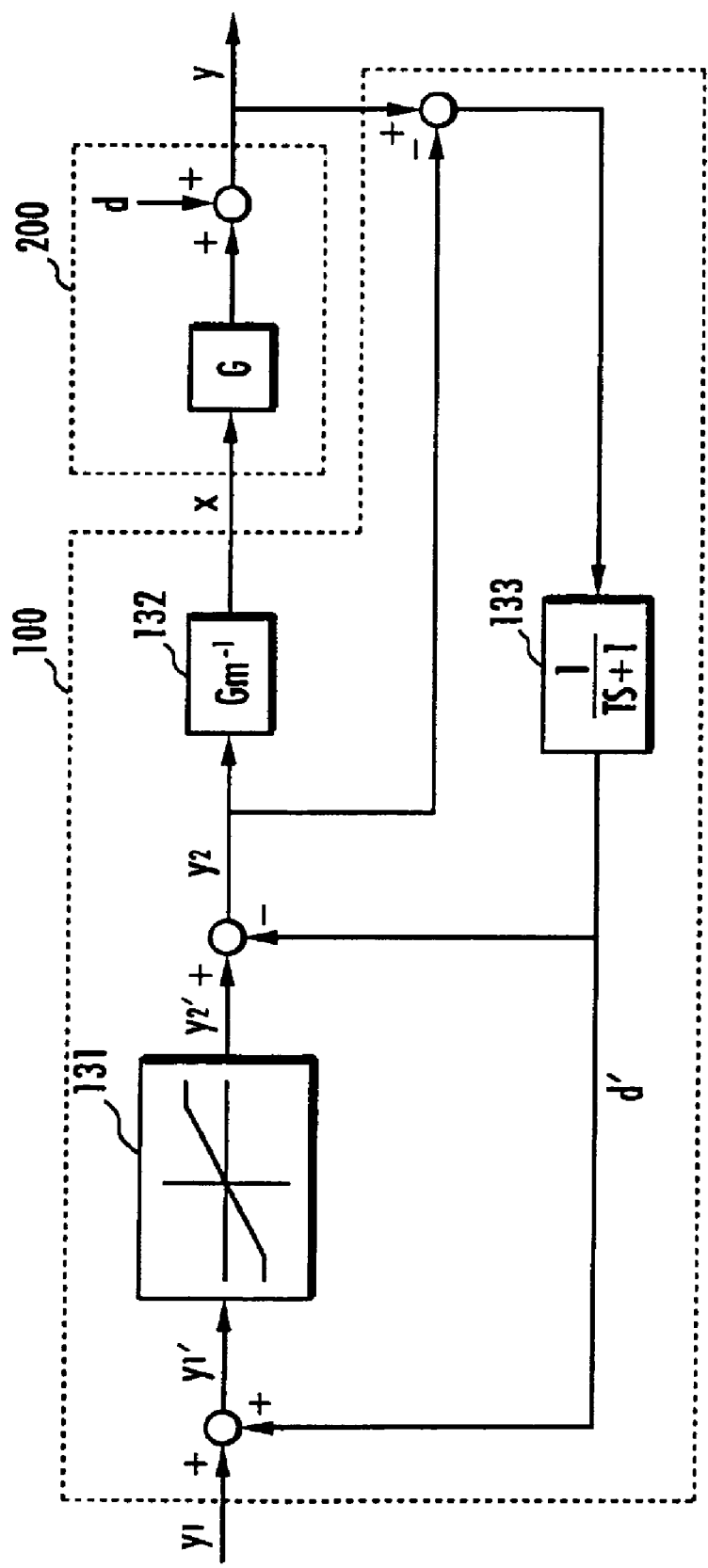
FIG. 3 is a block diagram of a control system according to a third embodiment of the present invention.

Referring now to FIG. 3, a control system according to a third embodiment of the present invention will be explained.

A block diagram of a control system 100 according to the third embodiment shown in FIG. 3 is obtained by assuming that the time constants $T_1$ and $T_2$ of the first filter 113 and the second filter 114 share the same time constant T as that in the control system 100 according to the first embodiment shown in FIG. 1, and combining the two filters 113 and 114 into one filter.

The control system 100 according to the third embodiment is equipped with a limiter 131, an inverse model arithmetic unit 132, and a filter 133.

The limiter 131 and the inverse model arithmetic unit 132 share the same constructions as those of the limiter 111 and the inverse model arithmetic unit 112 in the control system 100 according to the first embodiment. The filter 133 is a primary lag filter of time constant T.

The control system 100 according to the third embodiment determines the steady-state deviation estimation value d' according to an expression (15) given below.

$$d' = \{1/(Ts+1)\} \cdot (y - y_2) \quad (15)$$

Figure 4:
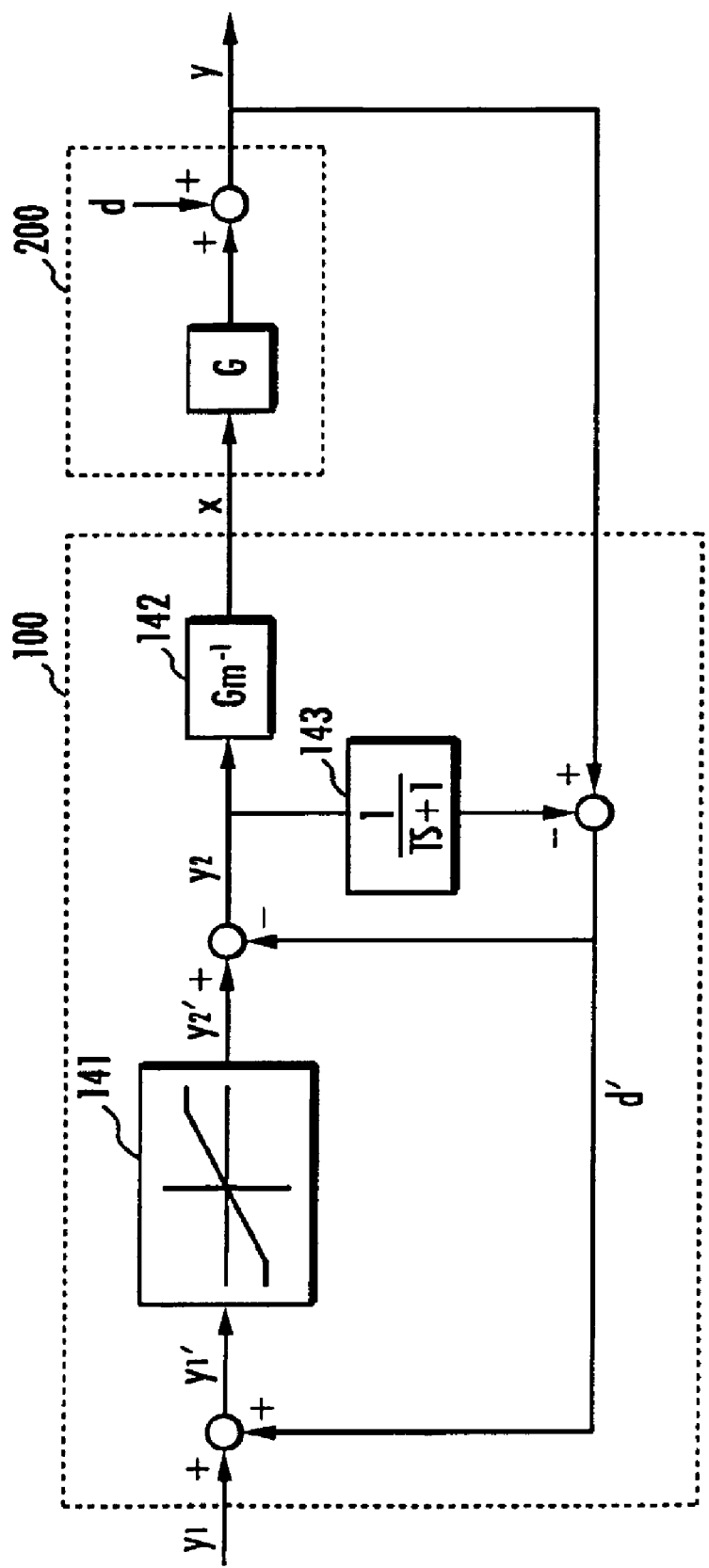
FIG. 4 is a block diagram of a control system according to a fourth embodiment of the present invention.

Referring now to FIG. 4, a control system according to a fourth embodiment of the present invention will be explained.

The block diagram of a control system 100 according to the fourth embodiment shown in FIG. 4 can be obtained by omitting the second filter 114 in the control system 100 according to the first embodiment shown in FIG. 1 on the basis of the approximation of $T_2 s \sim 0$.

The control system 100 according to the fourth embodiment is equipped with a limiter 141, an inverse model arithmetic unit 142, and a filter 143.

The limiter 141 and the inverse model arithmetic unit 142 have the same constructions as those of the limiter 111 and the inverse model arithmetic unit 112 in the control system 100 according to the first embodiment. The filter 143 corresponds to the first filter 113 in the control system 100 according to the first embodiment and it is a primary lag filter having a time constant T.

The control system 100 according to the fourth embodiment determines a steady-state deviation estimation value d' according to an expression (16) given below.

$$d'=y-\{1/(Ts+1)\}\cdot y_2 \qquad (16)$$

Figure 5:
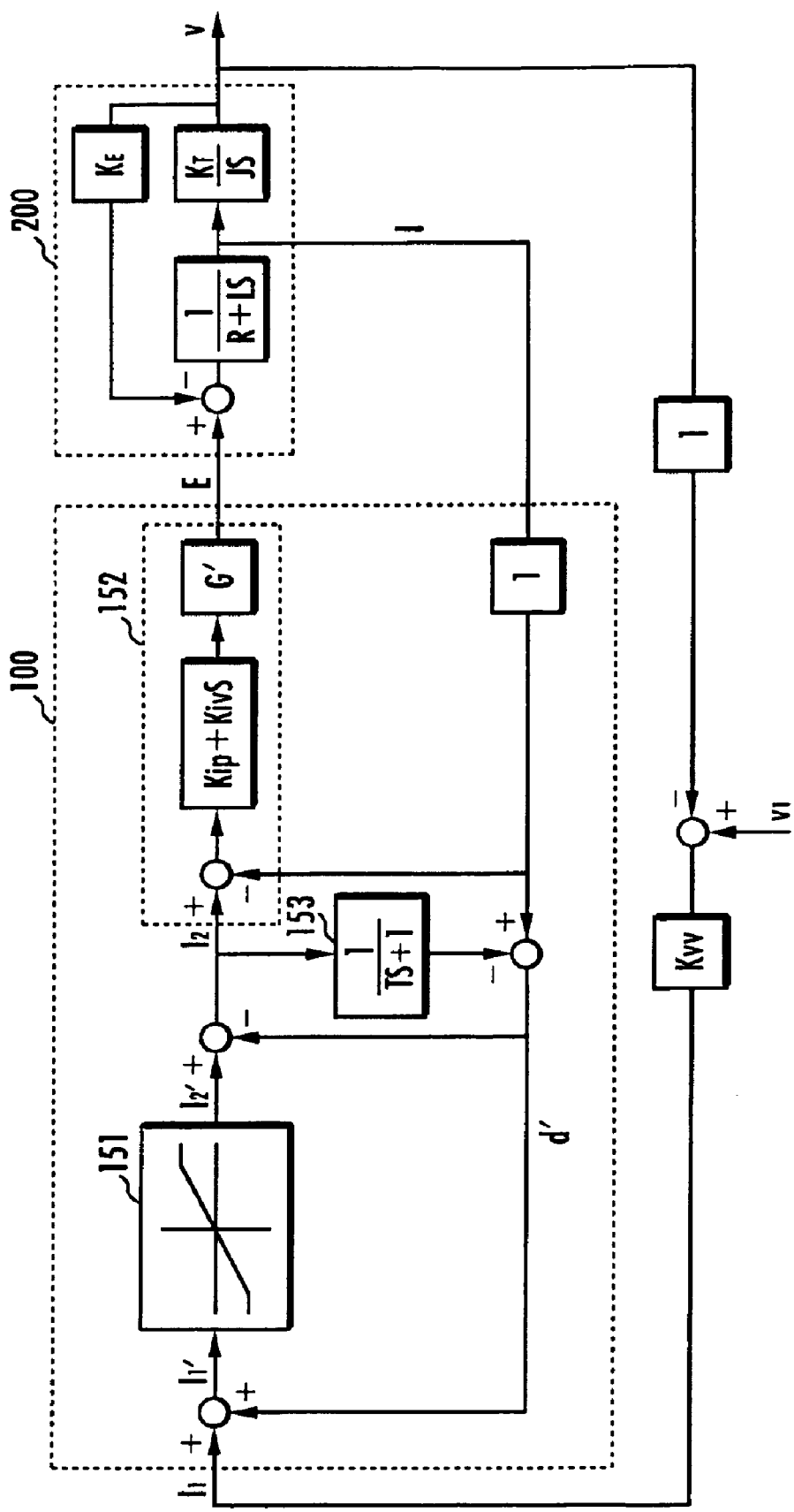
FIG. 5 is a block diagram of a control system according to a fifth embodiment of the present invention.

Referring now to FIG. 5, a control system according to a fifth embodiment of the present invention will be explained.

The control system 100 according to the fifth embodiment shown in FIG. 5 is equipped with a limiter 151, a manipulation variable determining unit 152, and a filter 153. The limiter 151, the manipulation variable determining unit 152, and the filter 153 correspond to the limiter 141, the inverse model arithmetic unit 142, and the filter 143, respectively, in the control system 100 of the fourth embodiment shown in FIG. 4. In the fourth embodiment, however, the inverse model arithmetic unit 142 is inserted as a series compensation element in a stage preceding the control system 100, thereby improving the phase characteristic in the aspect of feedforward.

In the fifth embodiment, its phase characteristic has been improved by the feedback type manipulation variable determining unit 152. The control system 100 according to the fifth embodiment controls a speed (control variable) v of a motor (controlled object) 200 by an applied voltage (manipulation variable) E. The following will explain the control.

In the fifth embodiment, an initial desired value $I_1$ of a motor current I is determined on the basis of a difference $v_1-v$ between the motor speed v and its initial desired value $v_1$ according to an expression (17) given below.

$$I_1=Kvv\cdot(v_1-v) \qquad (17)$$

where Kvv denotes a predetermined gain.

The manipulation variable determining unit 152 determines the voltage E to be applied to the motor 200 on the basis of a difference ($=I_2-I$) between the motor current I and its final desired value $I_2$ according to an expression (18) given below.

$$E=G'\cdot(Kip+Kivs)\cdot(I_2-I) \qquad (18)$$

where G' denotes a transmission element of a switching device controlling the voltage E applied from a power source (not shown) to the motor 200 in response to PWM signals, Kip and Kiv denote a P gain and a D gain, respectively, in a PD control rule for generating PWM signals.

The motor current I and the motor speed v based on the voltage E applied are represented by expressions (19) and (20), respectively, given below.

$$I=\{1/(R+Ls)\}\cdot(E-K_Ev) \qquad (19)$$

$$v=(K_T/Js)\cdot I \qquad (20)$$

where R denotes motor resistance, L denotes motor inductance, $K_E$ denotes an induced voltage constant, $K_T$ denotes a torque constant, and J denotes a motor inertia.

In the control system 100 according to the fifth embodiment, an estimation value (steady-state deviation estimation value) d' of a current control offset d generated by a counter-electromotive force $K_Ev$ of the motor 200 is determined by an expression (21) given below.

$$d'=1\cdot I-\{1/(Ts+1)\}\cdot I_2 \qquad (21)$$

The control system 100 according to the fifth embodiment permits stable and accurate control so that the motor current I remains in its allowable range $[I_-, I_+]$ and the motor speed v remains in its allowable range $[v_-, v_+]$ even if the counter-electromotive force $K_Ev$ is produced in the motor 200.

Figure 6:
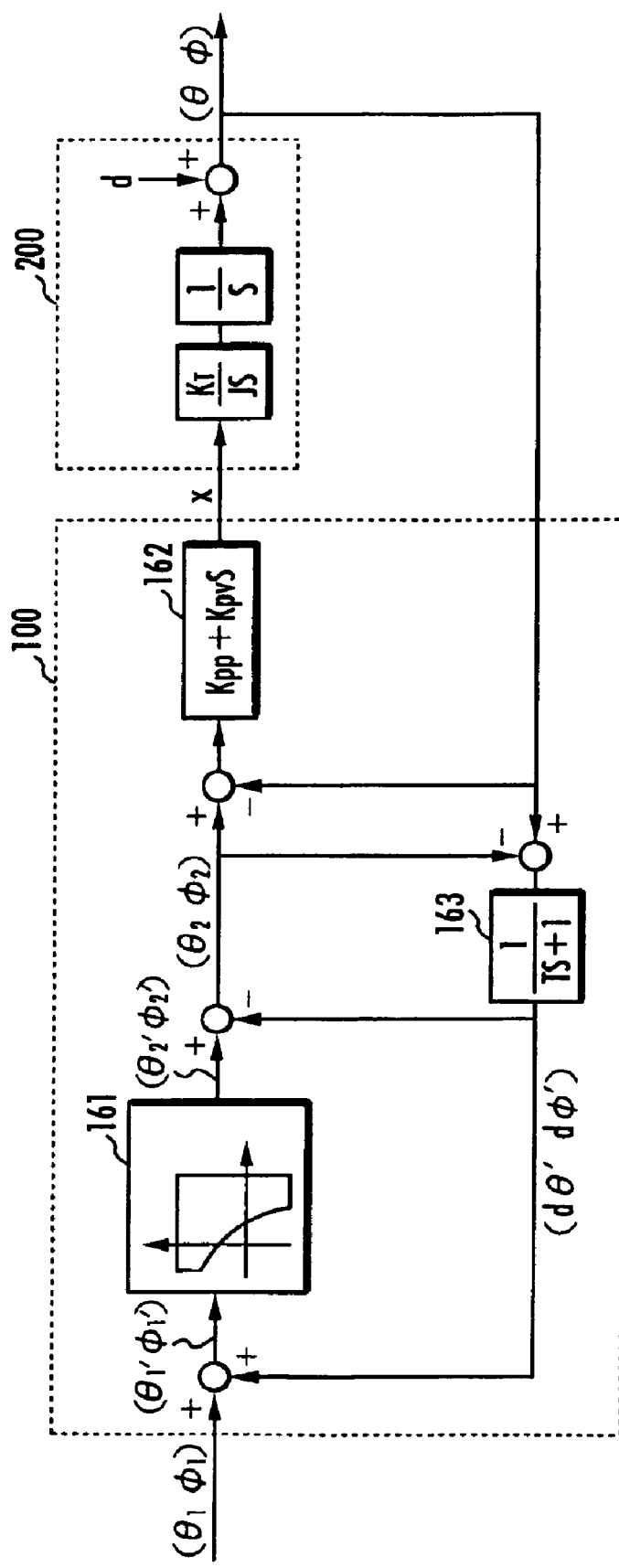
FIG. 6 is a block diagram of a control system according to a sixth embodiment of the present invention.
Figure 7:
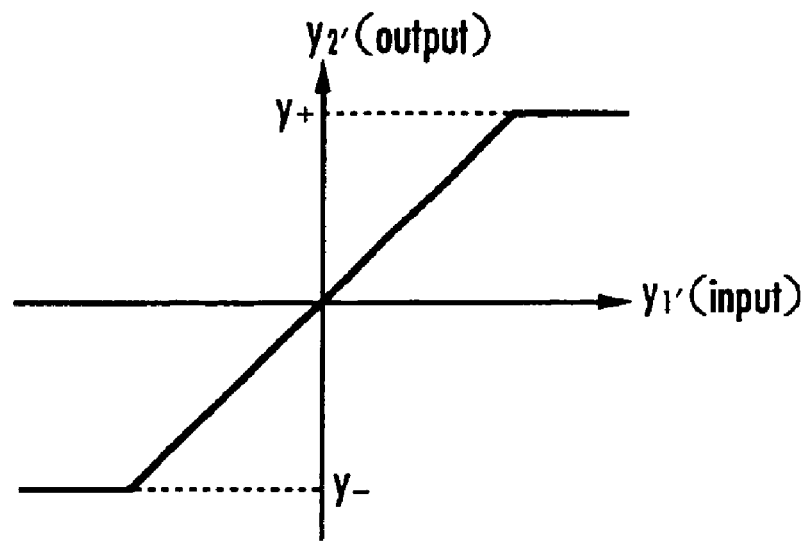
FIG. 7(a) and FIG. 7(b) are explanatory drawings of an allowable range (one-dimensional)
Figure 7:
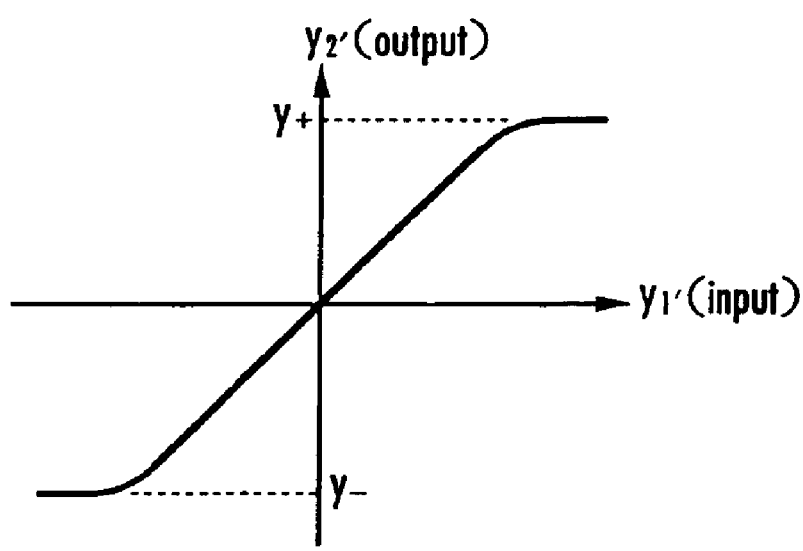
Figure 8:
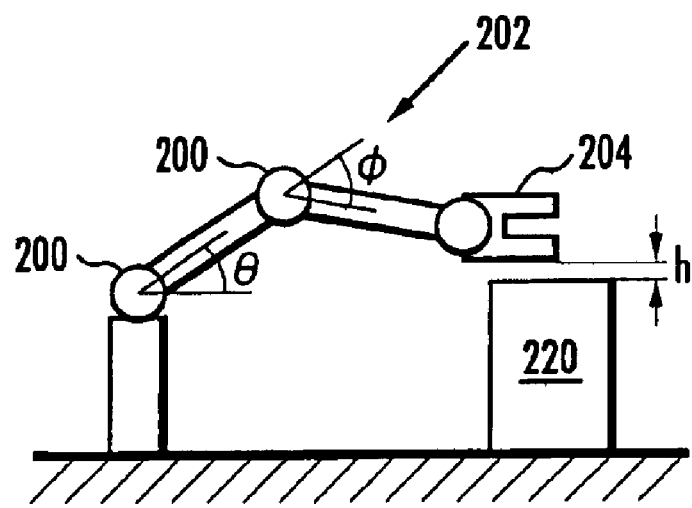
FIG. 8 is a block diagram of a manipulator, which is a controlled object in the sixth embodiment.
Figure 9:
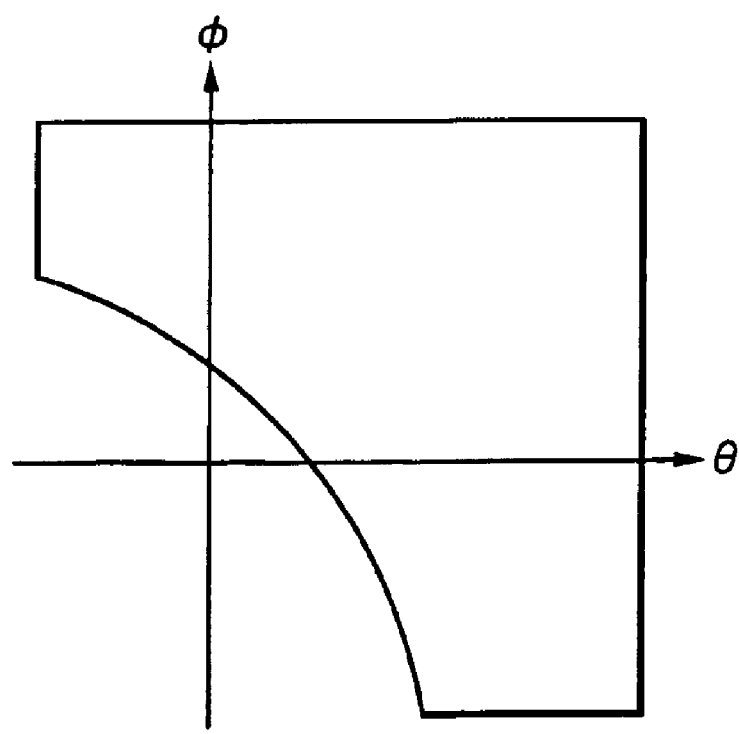
FIG. 9 is an explanatory drawing of an allowable range (two-dimensional)

Referring now to FIG. 6, FIG. 8, and FIG. 9, a control system according to a sixth embodiment will be explained. A control system 100 shown in FIG. 6 controls an angle (control variable) y=(θ, φ) of the motor 200 (controlled object) attached to a joint of an arm 202 of a manipulator shown in FIG. 8. Thus, the position (height h or the like from an object 220) of a hand 204 attached to a distal end of the arm 202 is controlled.

The control system 100 according to the sixth embodiment shown in FIG. 6 is equipped with a limiter 161, a manipulation variable determining unit 162, and a filter 163.

If a primary estimation value $y_1'=(\theta_1', \phi_1')$ of a joint angle (=motor angle) y=(θ, Φ) of the arm 202 of the manipulator shown in FIG. 8 is within the allowable range shown in FIG. 9, then the limiter 161 determines a secondary estimation value $y_2'=(\theta_2', \phi_2')$ that agrees with the primary estimation value $y_1'=(\theta_1', \Phi_1')$. Meanwhile, if the primary estimation value $y_1'=(\theta_1', \phi_1')$ is out of the allowable range shown in FIG. 9, then the limiter 161 determines a secondary estimation value $y_2'=(\theta_2', \phi_2')$ that agrees with a boundary value of the allowable range that is closest to the primary estimation value $y_1'=(\theta_1', \phi_1')$ (at which a distance norm is minimum).

The manipulation variable determining unit 162 outputs a motor current (manipulation variable) x=(i, j) on the basis of an input difference between a final desired value $y_2=(\theta_2, \phi_2)$ and the control variable y=(θ, φ) according to an expression (22).

$$x=(Kpp+Kpvs)(y_2-y) \qquad (22)$$

where Kpp and Kpv denote a P gain and a D gain, respectively, of a PD control rule to which the manipulation variable determining unit 162 conforms.

The filter 163 is represented in the form of a 2×2 diagonal matrix F according to an expression (23) given below.

$$F=diag[1/(Ts+1), 1/(Ts+1)] \qquad (23)$$

The control system 100 according to the sixth embodiment permits stable and accurate control to be accomplished so that the joint angle y=(θ, φ) remains in its allowable range (refer to FIG. 9) even when the steady-state deviation d takes place in the motor 200. Moreover, the control can be carried out such that a hand 204 attached to a distal end of the arm 202 remains in its allowable range.

The manipulation variable x and the control variable y or the like may be represented in the form of n-dimensional vectors (n≧3). At this time, the filter is represented as an n×n diagonal matrix having a lag element as a diagonal component (refer to expression (19)). However, the diagonal component may be "1" for a control variable component on which the steady-state deviation d may be ignored.

Figure 10:
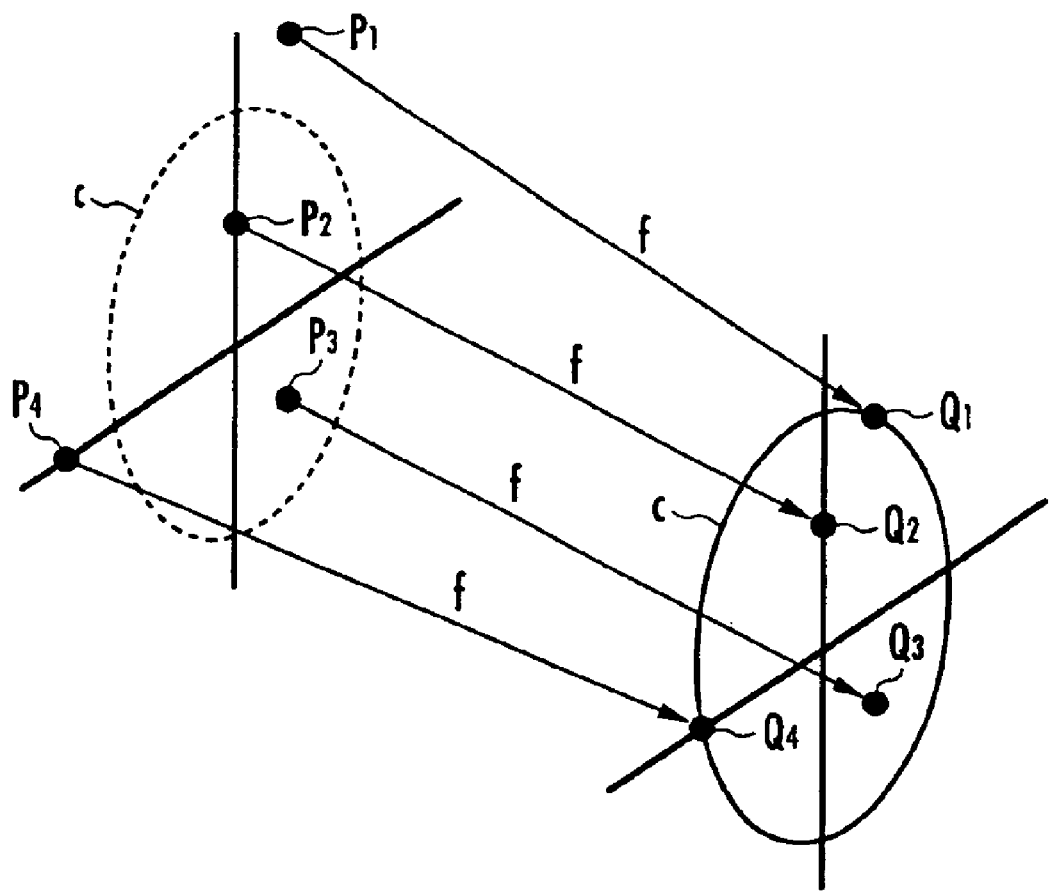
FIG. 10 is an explanatory drawing of n-dimensional mapping based on an allowable range (n-dimensional)

By mapping f represented as the n×n diagonal matrix, points $P_1$ to $P_4$ in an n-dimensional primary estimation value space conceptually shown in FIG. 10 are mapped in an n-dimensional secondary estimation value space. Mappings f $(P_2)=Q_2$ and f $(P_3)=Q_3$ of points $P_2$ and $P_3$ located within an allowable range C in the primary estimation value space agree with points $P_2$ and $P_3$, respectively. Mappings f $(P_1)=Q_1$ and f $(P_4)=Q_4$ of points $P_1$ and $P_4$ located out of the allowable range C in the primary estimation value space are mapped at boundary values of the allowable range C that are close to points $P_1$ and $P_4$, respectively. The mapping function f may be a smooth function, that is, a function in which grad does not suddenly change. This will make time-dependent changes of the control variable y also smooth.

The control systems 100 in the aforesaid embodiments may be discretized by forward difference, backward difference, bilinear transformation, etc.

Figure 11:
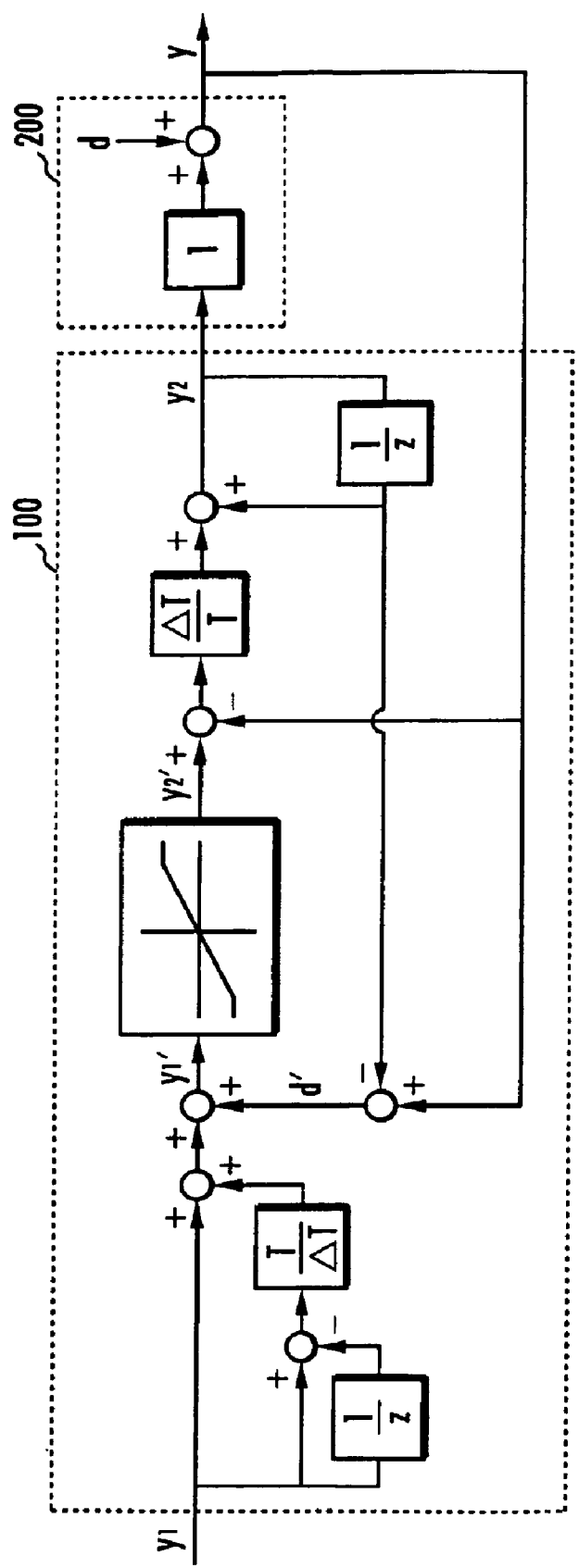
FIG. 11 is a block diagram of a control system according to another embodiment of the present invention.
Figure 12:
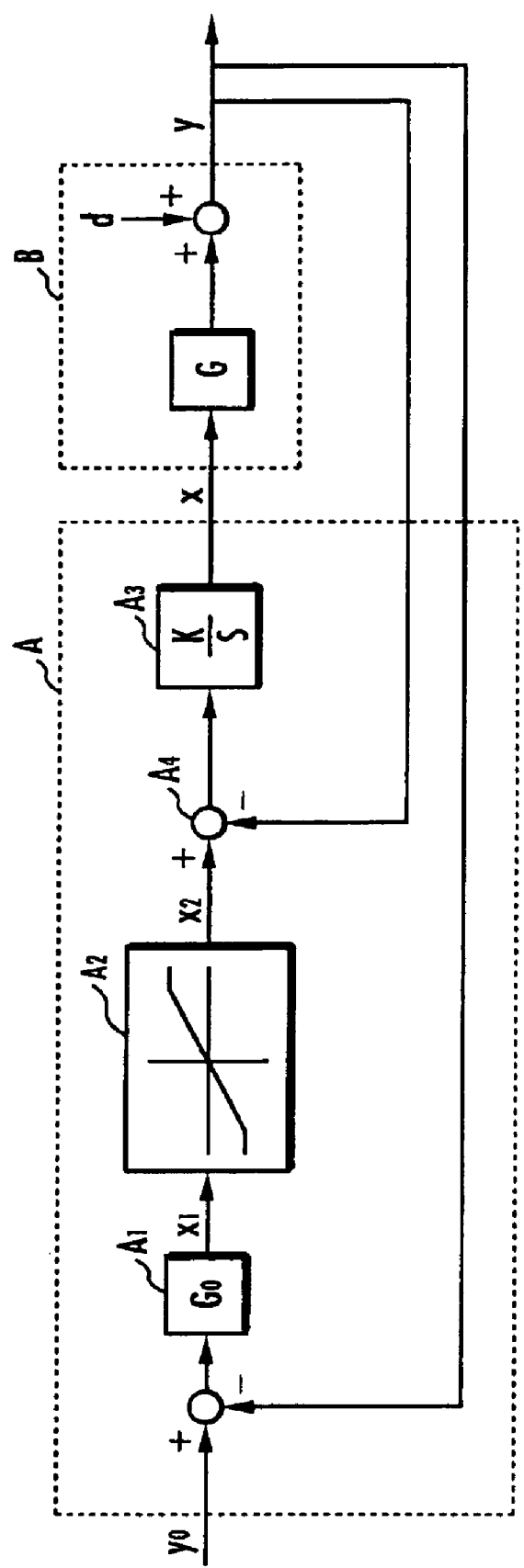
FIG. 12 is a block diagram of a conventional control system.

For example, FIG. 11 is a block diagram of a control system 100 obtained by discretizing the control system 100 according to the second embodiment shown in FIG. 2 by a forward difference.

The block diagram of the control system 100 shown in FIG. 11 is obtained by approximating the transmission element $Gm^{-1}$ and G to "1" and then performing discretization by forward difference in the control system 100 in the second embodiment shown in FIG. 2. In this case, $\Delta T$ is a control cycle. An output of a unit of a transmission element 1/z represents a previous value of a unit input (the unit input determined before time $\Delta T$) constituted of the initial desired value $y_1$ and the final desired value $y_2$. The time constant T is set to a value of $\Delta T$ or more.

In any one of the aforesaid embodiments, the transmission elements of the filters may be represented more generally.

For instance, in the control system 100 according to the first embodiment shown in FIG. 1, the transmission element $F_1$ of the first filter 113 may be represented as a general form according to an expression (24) given below by $B_1$ (s) and $C_1$ (s) of a lower order than $B_1$ (s). Similarly, the transmission element $F_2$ of the second filter 114 may be represented as a general form according to an expression (25) given below by $B_2$ (s) and $C_2$ (s) of the same order as or a lower order than $C_1$ (s).

$$F_1 = C_1(s)/B_1(s) \tag{24}$$

$$F_2 = C_2(s)/B_2(s) \tag{25}$$

The control unit 100 may be provided with an initial desired value determining unit (not shown) for determining the initial desired value $y_1$ according to an expression (26) given below on the basis of an input initial manipulation variable $x_1$ determined manually or by another control system (not shown). The transmission element Gm of the initial desired value determining unit corresponds to an inverse function of the transmission element $Gm^{-1}$, such as the inverse model arithmetic unit 112.

$$y_1 = Gm \cdot x_1 \tag{26}$$

What is claimed is:

1. A control system for controlling a control variable y of a controlled object through a manipulation variable x, comprising:

a steady-state deviation estimating means for estimating a steady-state deviation d in a controlled object as a steady-state deviation estimation value d' based on the control variable y and a final desired value $y_2$;

a primary estimating means for estimating the control variable y of the controlled object according to an initial desired value $y_1$ as a primary estimation value $y_1$' based on at least the initial desired value $y_1$ and the steady-state deviation estimation value d';

a desired value determining means for determining a final desired value $y_2$ agreeing with the initial desired value $y_1$ if the primary estimation value $y_1$' is within an allowable range, while determining the final desired value $y_2$ based on at least a boundary value of the allowable range if the primary estimation value $y_1$' out of the allowable range; and a manipulation variable determining means for determining a manipulation variable x according to the final desired value $y_2$.

2. The control system according to claim 1, wherein the steady-state deviation estimating means estimates, as the steady-state deviation estimation value d', a difference between the control variable y and a value obtained by passing the final desired value $y_2$ through a low-pass filter or a delaying means.

3. The control system according to claim 1, wherein the steady-state deviation estimating means estimates, as the steady-state deviation estimation value d', a difference between a value obtained by passing the control variable y through a low-pass filter or the delaying means and a value obtained by passing the final desired value $y_2$ through a low-pass filter or a delaying means.

4. The control system according to claim 1, wherein the steady-state deviation estimating means estimates, as the steady-state deviation estimation value d', a value o tamed by passing a difference between the control variable y and the final desire value $y_2$ through a low-pass filter or a delaying means.

5. The control system according to claim 1, wherein the primary estimating means estimates a sum of the initial desired value $y_1$ and the steady-state deviation estimation value d' or a value obtained by passing the sum $y_1$+d' through a low-pass filter or a delaying means as the primary estimation value $y_1$'.

6. The control system according to claim 1, further comprising a secondary estimating means for directly estimating the primary estimation value $y_1$' as a secondary estimation value $y_2$' if the primary estimation value $y_1$' is within the allowable range, while estimating a value within the allowable range as the secondary estimation value $y_2$' if the primary estimation value $y_1$' is out of the allowable range, and the desired value determining means determines the final desired value $y_2$ based on the secondary estimation value $y_2$' and the steady-state deviation estimation value d'.

7. The control system according to claim 6, wherein, based on the primary estimation value $y_1$', the secondary estimating means determines the secondary estimation value $y_2$' by a continuous or smooth mapping from the primary estimation value $y_1$' to the secondary estimation value $y_2$'.

8. The control system according to claim 6, wherein the desired value determining means subtracts the steady-state deviation estimation value d' from the secondary estimation value $y_2$' to determine the final desired value $y_2$.

9. The control system according to claim 6, wherein the desired value determining means determines the final desired value $y_2$ based on a difference between the control variable y and the secondary estimation value $y_2$' or a difference between the secondary estimation value $y_2$' and a value obtained by passing the control variable y trough a low-pass filter or a delaying means according to a control rule for converging the difference to zero.

10. The control system according to claim 9, wherein the desired value determining means determines the final desired value $y_2$ by passing a difference between the control variable and the secondary estimation value $y_2$' or a difference between a value obtained by passing the control variable y through the low-pass filter or the delaying means and the secondary estimation value $y_2$' through a transmission element having at least integration.

11. The control system according to claim 1, wherein the manipulation variable determining means has a transmission function $Gm^{-1}$ that satisfies a relationship of $Gm^{-1} \cdot G \approx 1$ between itself and a transmission function G of a controlled object.

* * * * *

UNITED STATES PATENT AND TRADEMARK OFFICE
CERTIFICATE OF CORRECTION

PATENT NO. : 6,961,627 B2
DATED : November 1, 2005
INVENTOR(S) : Takenaka

It is certified that error appears in the above-identified patent and that said Letters Patent is hereby corrected as shown below:

Column 13,
Line 63, before "out", insert -- is --.

Column 14,
Line 16, delete "o tamed" and insert -- obtained --.
Line 18, delete "desire" and insert -- desired --.
Line 56, after "variable" insert -- y --.

Signed and Sealed this

Twenty-seventh Day of December, 2005

JON W. DUDAS
*Director of the United States Patent and Trademark Office*